US012172340B2

(12) United States Patent
Chen

(10) Patent No.: US 12,172,340 B2
(45) Date of Patent: Dec. 24, 2024

(54) MULTI-LAYER ROLLER STABILIZING STRUCTURE OF STONE CUTTING MACHINE

(71) Applicant: NEW REN YANG ENTERPRISE CORP., Taichung (TW)

(72) Inventor: Yueh-Ting Chen, Taichung (TW)

(73) Assignee: NEW REN YANG ENTERPRISE CORP., Taichung (TW)

( * ) Notice: Subject to any disclaimer, the term of this patent is extended or adjusted under 35 U.S.C. 154(b) by 328 days.

(21) Appl. No.: 17/939,765

(22) Filed: Sep. 7, 2022

(65) Prior Publication Data

US 2024/0075654 A1 Mar. 7, 2024

(51) Int. Cl.
*B28D 7/04* (2006.01)
*B28D 7/02* (2006.01)

(52) U.S. Cl.
CPC ................. *B28D 7/04* (2013.01); *B28D 7/02* (2013.01)

(58) Field of Classification Search
CPC ............ B28D 7/04; B28D 1/047; B28D 1/06; B28D 1/127; B28D 1/068; B28D 1/062; B28D 1/12; B28D 1/02; B23Q 9/0064; B23Q 9/0071; B23Q 9/0078; B23Q 1/60; B23Q 1/601; B25H 1/0021; B25H 1/0035; B25H 1/0078; B23D 47/02; B23D 47/025; B23D 55/06; B23D 55/10; B23D 51/025; B23D 55/08; B27B 15/02; B27B 15/04; B27B 13/02; B27B 13/08; B27B 13/12
USPC ....... 125/19, 16.02, 13.01, 12, 16.01, 13.03; 83/762, 820, 821, 859; 451/411; 144/286.1–287
See application file for complete search history.

(56) References Cited

U.S. PATENT DOCUMENTS 6,276,990 B1 * 8/2001 Greenland ........... B23D 47/025 451/11
2005/0103175 A1 * 5/2005 O'Banion ............ B23D 47/025 83/477.1
2013/0152754 A1 * 6/2013 Lawlor ................ B23D 47/045 83/437.1

* cited by examiner

*Primary Examiner* — Edward F Landrum
*Assistant Examiner* — Sarah Akyaa Fordjour
(74) *Attorney, Agent, or Firm* — Muncy, Geissler, Olds & Lowe, P.C.

(57) ABSTRACT

A multi-layer roller stabilizing structure of a stone cutting machine, comprising: a base, a water storage basin, a slider assembly, a workbench and a bench rack. The water storage basin is disposed on the base. The slider assembly includes a roller rack and plural upper sliders and lower sliders. Two sides of the roller rack are provided with an upper roller, a middle and a lower rollers respectively. The upper and the lower sliders are respectively disposed between the upper, the middle and the lower rollers. The bench rack is disposed on the upper sliders, the lower sliders are disposed on the base. The workbench and the bench rack are linked to move with the upper sliders. The upper and the lower sliders thereby enabling offseting from top-to-bottom. The roller rack is displaced by linkage, and continuously stabilizes the workbench and extends a distance of displacement for the workbench.

6 Claims, 13 Drawing Sheets

MULTI-LAYER ROLLER STABILIZING STRUCTURE OF STONE CUTTING MACHINE

BACKGROUND OF THE INVENTION a) Field of the Invention

The present invention relates to a multi-layer roller stabilizing structure of a stone cutting machine, more particularly to a multi-layer roller stabilizing structure of a stone cutting machine comprising a roller rack having multiple layers added thereto, using upper sliders and lower sliders for relative displacements and offsets from top-to-bottom, so as to stabilize the workbench and keep the workbench horizontal without tilting upwards during forward and backward displacements. The roller rack and the workbench are linked in movement with rollers, so that a force application point of downward cutting by a saw blade is linked to a roller structure. During cutting movements, the rollers and a workbench reinforcement support rack are available for support, so as to enable the roller rack to be kept under continuous stabilization, safety and precise cutting dimensions during operation. The roller rack is actively linked so as to achieve a maximum limit of displacement distance for the workbench, extend a distance of forward and backward displacements for the workbench and widen a placement width for the workbench.

b) Description of the Prior Art

It is conventionally known that a traditional stone cutting machine is mainly used in construction sites. The large size, fixed style and non-disassemble unfoldable type make transfer of the machine difficult in the original environment. In addition, a traditional portable stone cutting machine can only manage limited size cutting due to limitation of the machine size. If cutting of large stones is required, a large-size machine is required for such operations. A traditional workbench is to designed to be a single-layer rail, a plate is placed on a slidable workbench, when the workbench is moved to front-most and rear-most positions, a support surface is absent below a saw blade central point and a cutting force application point of the slidable workbench, causing the workbench to become unstable and tilted upwards when an operator applies a force on the plate at the front end or rear end of the workbench, and resulting in safety issues and cutting wrong dimensions during cutting stones. FIGS. 1 and 2 show a bench rack 10 of a traditional portable stone cutting machine, which has a workbench 11, a rack 12 and a water storage basin 13. The workbench 11 has a cutting groove 111, the right side below the workbench 11 is pivotally connected to two rollers 14, the rollers 14 have large recessed arcs on a surface thereof, the left side below the workbench 11 is pivotally connected to two rollers 15, the rollers 15 have small recesses on a surface thereof. The water storage basin 13 is disposed in the rack 12, the rack 12 is a frame constituted of plural rods mounted together, the upper right side thereof is joined to a slider 16, and the rollers 14 are lent on the slider 16, so as to enable the rollers 14 to slide and move by leaning on the slider 16, the upper left side of the rack 12 is joined to a L-shaped slide board 17, the rollers 15 are leant on the L-shaped slide board 17, so as to enable the rollers 15 to slide and move by leaning on the L-shaped slide board 17. The rollers 14 and the rollers 15 may be displaced synchronously in linkage with the workbench 11. A cutter (not shown in the figures) is positioned on the rack 12, the cutter has a saw blade (the saw blade may be lowered into the cutting groove 111, and the saw blade of the cutter may be raised when not cutting), a plate is placed above the workbench 11, and cutting is performed by sliding the workbench 11 to enable the plate to slide synchronously. In addition to placement of a plate, the operator usually applies a force to press on the plate on the workbench 11 by placing his hands thereon, so as to enable the plate to be stably cut by the cutter. However, such normal actions lead to the alarming issue of tilting upwards of the workbench 11 when the workbench 11 is pressed downwards by the force from the hands, thus causing dangerous cutting actions. The reason being that where the hands are pressing on is a front position of the workbench 11, and also a rear position of the workbench 11, which are not the adequate positions for pressing the workbench 11. In such instances, uneven pressing by the hands leads to the rollers 14 coming off the slider 16 or the rollers 15 coming off the L-shaped slide board 17, and the workbench 11 tilting upwards, which makes the saw blade of the cutter not to follow the cutting groove 111 on the workbench 11, and easily causes accidents that harm the operator under high-speed spinning. Moreover, under the limitations of the rollers 14 below the workbench 11 being directly lent on the slider 16 and the rollers 15 being directly lent on the L-shaped slide board 17, the distances for pushing the workbench 11 forward and backward are limited. The backward slidable distance is limited to a width of the rack 12, and if the plate is longer than a length of the slidable distance, the plate itself can only be further pushed forward alone for cutting, which causes cutting to be imprecise. Or the front end and the rear end of the plate are switched for cutting, but after switching ends, the width between a cutting line and a leaning side of some plates are different from the distance before switching, which prevents the front end and the rear end of the plate from being switched for cutting. Further, the large plates which are currently popular have a large surface area, and the surface area of the workbench 11 of the portable stone cutting machine cannot be used to hold such plates. In addition, regarding large plates which are particularly wide, apart from having insufficient length for holding such plates, the width of the workbench 11 is also insufficient for holding particularly wide large plates, and thus the portable stone cutting machine are inconvenient and troublesome to the operator in many ways.

SUMMARY OF THE INVENTION

A multi-layer roller stabilizing structure of a stone cutting machine comprising:

- a base having a water storage basin disposed thereon, the base is provided with plural positioning boards at the front and at the back thereof, one side of the base may enable a cutter to be disposed thereon, and the cutter has a saw blade;
- a slider assembly assembled on the base, the slider assembly is provided with a roller rack and a pair of upper sliders and a pair of lower sliders, the roller rack is a frame structure having two sides thereof respectively provided with plural roller sets, each of the roller sets is a three-layer combination of an upper roller, a middle roller and a lower roller, the upper sliders are disposed above the lower sliders and mutually parallel to the lower sliders, the lower sliders are disposed between the middle roller and the lower roller, the upper sliders are disposed between the upper roller and the middle roller, the lower sliders have two ends thereof positioned on the positioning boards at the front and at the back of the base;

a workbench for placing stones, the workbench is supported by a bench rack, the bench rack is disposed above the slider assembly, the bench rack is constituted of two front-to-back symmetrical straddle boards and one lateral extension platform, the two symmetrical straddle boards are disposed in a front position and a rear position of the bench rack, two ends of the upper sliders are positioned in the straddle boards at the front and at the back of the bench rack;

accordingly, the workbench and the bench rack are moved synchronously in linkage with the upper sliders, the lower sliders are positioned on the base, the upper sliders and the lower sliders of the slider assembly are relatively displaced and offset from top-to-bottom, and the active roller rack is displaced forwards and backwards, so as to stabilize the workbench in front and rear displacements and extend a distance of front and rear displacements of the workbench.

A main object of the present invention is to provide a roller rack having multiple layers added thereto, using upper sliders and lower sliders for relative displacements and offsets from top-to-bottom, so as to stabilize the workbench and keep the workbench horizontal without tilting upwards during forward and backward displacements. The roller rack and the workbench are linked in movement with the rollers, so that a force application point of downward cutting by the saw blade is linked to a roller structure. During cutting movements, the rollers and a workbench reinforcement support rack are available for support, so as to enable the roller rack to be kept under continuous stabilization, safe and precise cutting dimensions during operation.

A secondary object of the present invention is to provide an active roller rack, the workbench may be displaced in linkage with the roller rack so as to extend a maximum forward and backward displacement distance for the workbench, overcome limitation of a cutting stroke thereof by machine length, and develop a linkage double-rail slide workbench structure, in addition to keeping an original cutting stroke of a small machine, a 1.6-fold cutting stroke is added by extension, thus making the small machine more convenient for transportation in a work environment.

A further object of the present invention is to provide a side of the workbench having an extendable placeable width for the workbench, the side of the workbench has a lateral extension platform having an anti-slip block added thereto by design, which may be used to achieve the actions of immediate moving and stopping without locking and fixing the lateral extension platform, a cutting bench surface is enlarged to facilitate placement of larger stone sizes, and a stretch rod is not shaken, displaced or detached along with vibrations of the cutter.

Yet another object of the present invention is to provide a workbench having a large bench surface and a small bench surface, which are detachable and non screw-fastening type for enabling fast assembly and disassembly, reducing a packing size and a transportation volume thereof, the workbench is designed to have a fast disassembly mode to facilitate convenient cleaning and washing by an operator during use.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 6:
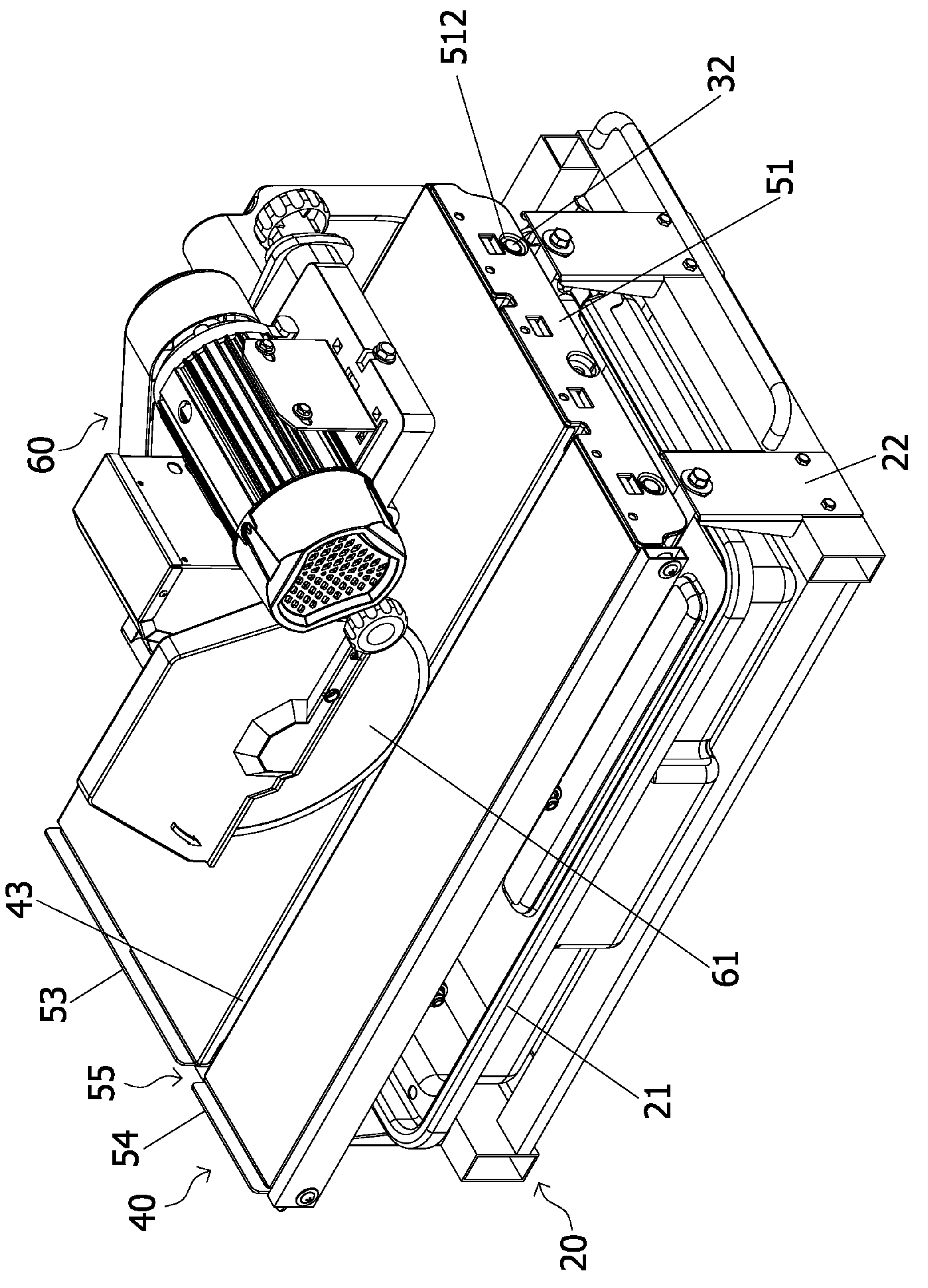
FIG. 6 is a stereoscopic schematic view showing a disposed cutter of the present invention.
Figure 7:
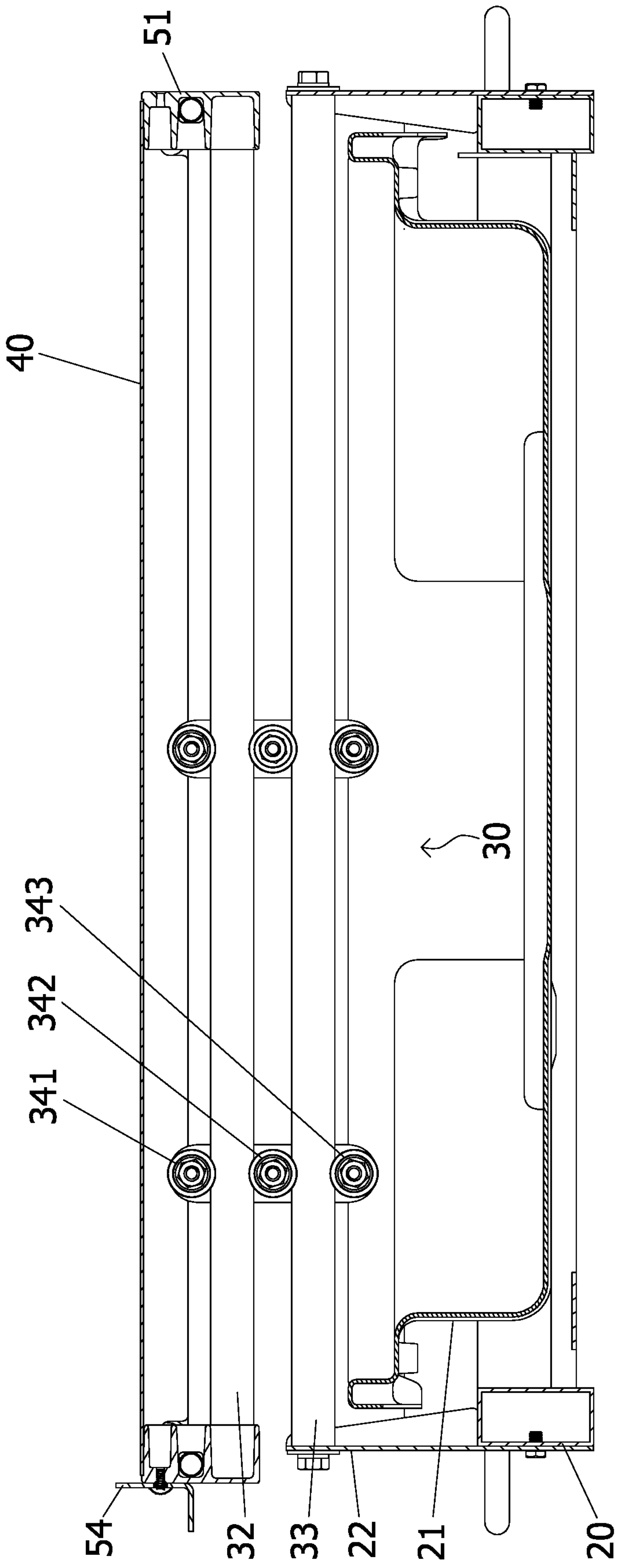
FIG. 7 is a plan assembled schematic view showing the present invention.

As shown in FIGS. 3, 4, 5, 7, the present invention comprises a base 20, a water storage basin 21, a slider assembly 30, a workbench 40 and a bench rack 50. The base 20 is disposed in a bottom portion, the base 20 is a frame which enables the water storage basin 21 to be disposed thereon, and the base 20 has one side thereof for enabling a cutter 60 to be disposed thereon (as shown in FIG. 6). The lower portion of the base 20 may be arranged as that in a general portable cutter, which may be disposed as an X-shaped foldable stand (the stand is not shown here, and an X-shaped foldable stand is a traditional technique). The cutter 60 has a saw blade 61, the base 20 has two positioning boards 22 respectively provided at the front and at the back thereof, a lower slider assembly hole 221 is respectively provided above the positioning boards 22, the slider assembly 30 is disposed on the base 20, and the slider assembly 30 is provided with a roller rack 31, a pair of upper sliders 32 and a pair of lower sliders 33, the roller rack 31 is a frame structure having two sides thereof respectively provided with three roller sets 34, each of the roller sets 34 is a three-layer combination of an upper roller 341, a middle roller 342 and a lower roller 343, the upper sliders 32 are disposed above the lower sliders 33 and mutually parallel to the lower sliders 33, the lower sliders 33 are disposed between the middle roller 342 and the lower roller 343, the upper sliders 32 are disposed between the upper roller 341 and the middle roller 342, an inner side of the roller rack 31 of the slider assembly 30 is fixed with plural support racks 35, upper portions of the support racks 35 are U-shaped blocks 351, top surfaces of the support racks 35 are contacted with a bottom surface of the workbench 40, the lower slider assembly holes 221 of each of the positioning boards 22 of the base 20 are used to fasten end portions of the lower sliders 33, so as to enable two ends of the lower sliders 33 to be positioned on the positioning boards 22 at the front and at the back of the base 20. The workbench 40 is used to place plates, the workbench 40 is supported by a bench rack 50, the bench rack 50 is disposed above the slider assembly 30, the bench rack 50 is constituted of two front-to-back symmetrical straddle boards 51 and one lateral extension platform 52, the two symmetrical straddle boards 51 are disposed in a front position and a rear position of the bench rack 50, two ends of the upper sliders 32 are positioned in the straddle boards 51 at the front and at the back of the bench rack 50. The workbench 40 is a combination of two sheets including a large bench surface 41 and a small bench surface 42. The large bench surface 41 has a lateral sideboard 411 disposed on two sides thereof, respectively, the small bench surface 42 has a lateral sideboard 421 disposed on two sides thereof, respectively. A cutting groove 43 is formed between the large bench surface 41 and the small bench surface 42 and used to allow a saw blade 61 to enter. Top surfaces of the straddle boards 51 of the bench rack 50 are provided with two positioning grooves 511 and at least two upper slider assembly holes 512, in which one positioning groove 511 is used to enable the lateral sideboard 411 on the inner side of the large bench surface 41 and the lateral sideboard 421 on the inner side of the small bench surface 42 to be embedded in, the upper slider assembly holes 512 are used to fasten end portions of the upper sliders 32, so as to enable the bench rack 50 to be positioned on the two upper sliders 32. The workbench 40, the bench rack 50 and the upper sliders 32 are disposed above the roller rack 31, and the workbench 40, the bench rack 50 and the upper sliders 32 are linked to move synchronously. Front portions of the straddle boards 51 at the front of the bench rack 50 are fixed with a long guiding ruler 53 and a short guiding ruler 54, both the long guiding ruler 53 and the short guiding ruler 54 have L-shaped cross sections, an interval 55 (FIGS. 3, 6) is formed between the long guiding ruler 53 and the short guiding ruler 54, and the long guiding ruler 53 and the short guiding ruler 54 may be used to allow a plate to lean on. A stretch rod 56 is respectively embedded into the front-to-back symmetrical straddle boards 51 of the bench rack 50. The stretch rods 56 and the straddle boards 51 are provided parallelly. End portions of the stretch rods 56 are joined to the lateral extension platform 52, and two sides of the straddle boards 51 are respectively provided with an anti-slip block 57. The anti-slip blocks 57 are contacted with the stretch rods 56. The lateral extension platform 52 is linked to and may be pulled outwards synchronously with the stretch rods 56 from a lateral position of the straddle boards 51. The anti-slip blocks 57 provide the stretch rods 56 with a frictional force, so as to enable the stretch rods 56 to have stabilizing and anti-slip functions after being pulled outwards. The stretch rods 56 are not shaken and displaced along with vibrations of the cutter 60, and the stretch rods 56 and the lateral extension platform 52 may be used for placement of plates having larger surface areas.

Figure 1:
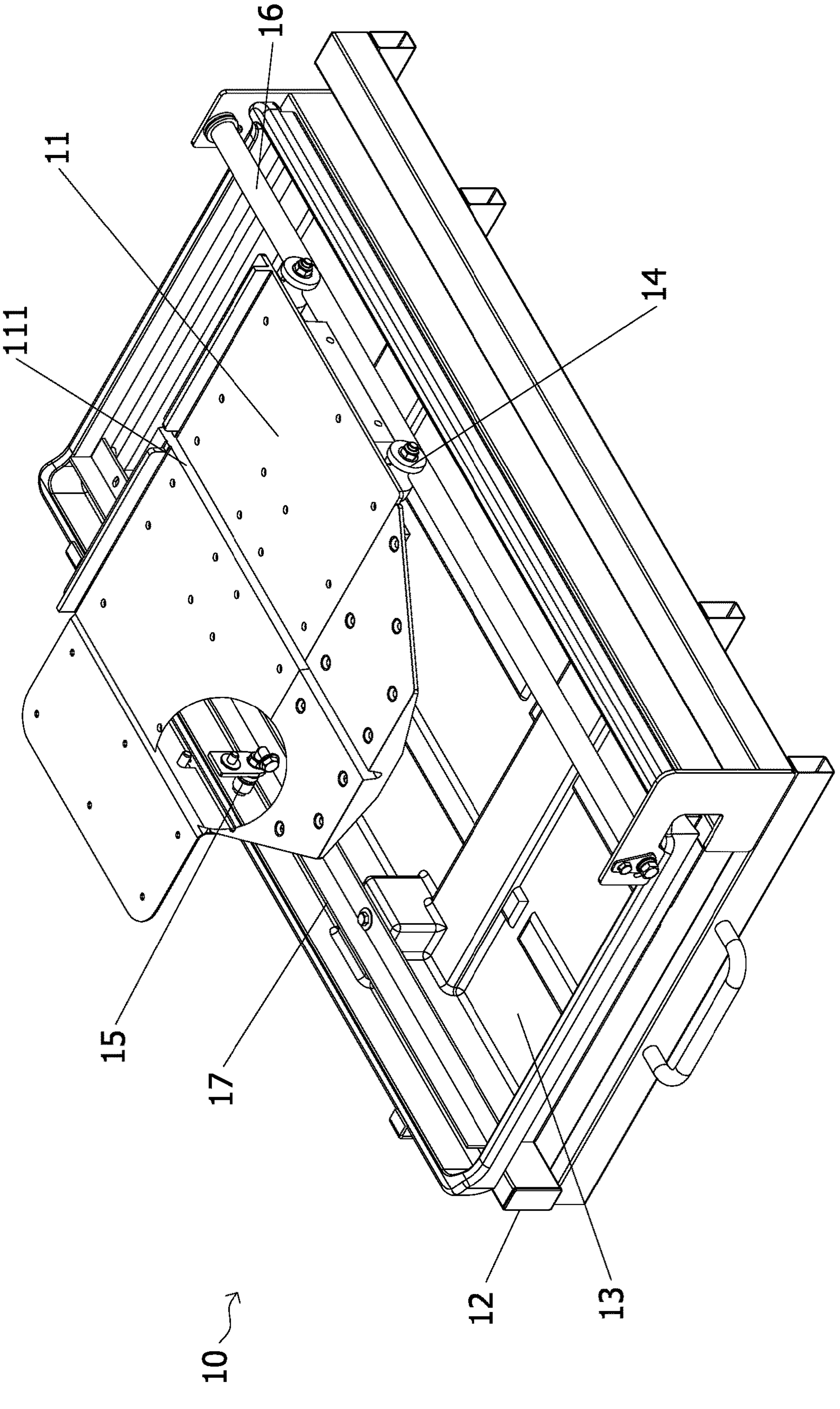
FIG.1 Prior Art
FIG. 1 is a stereoscopic assembled schematic view showing a traditional stone cutting machine.
Figure 2:
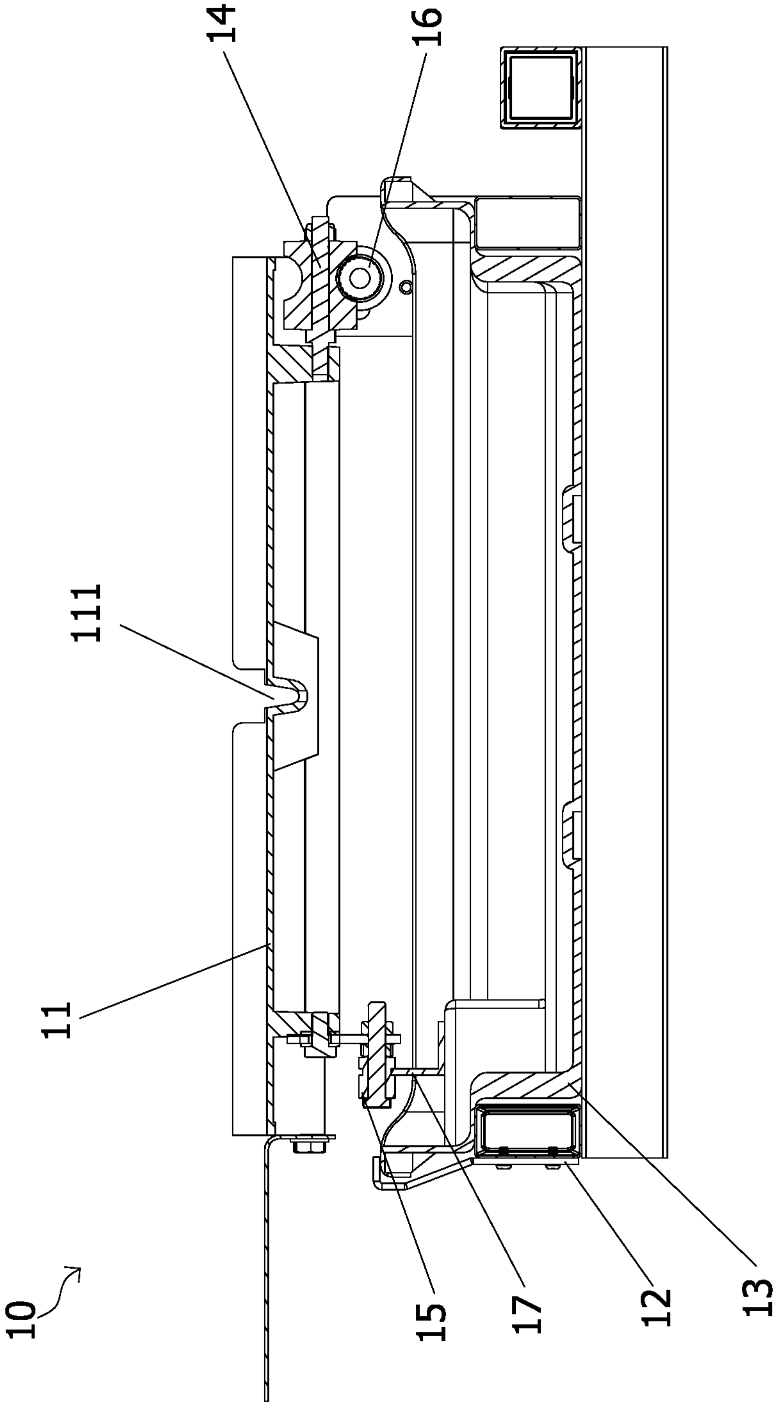
FIG.2 Prior Art
FIG. 2 is a dissected schematic view showing a traditional stone cutting machine.
Figure 3:
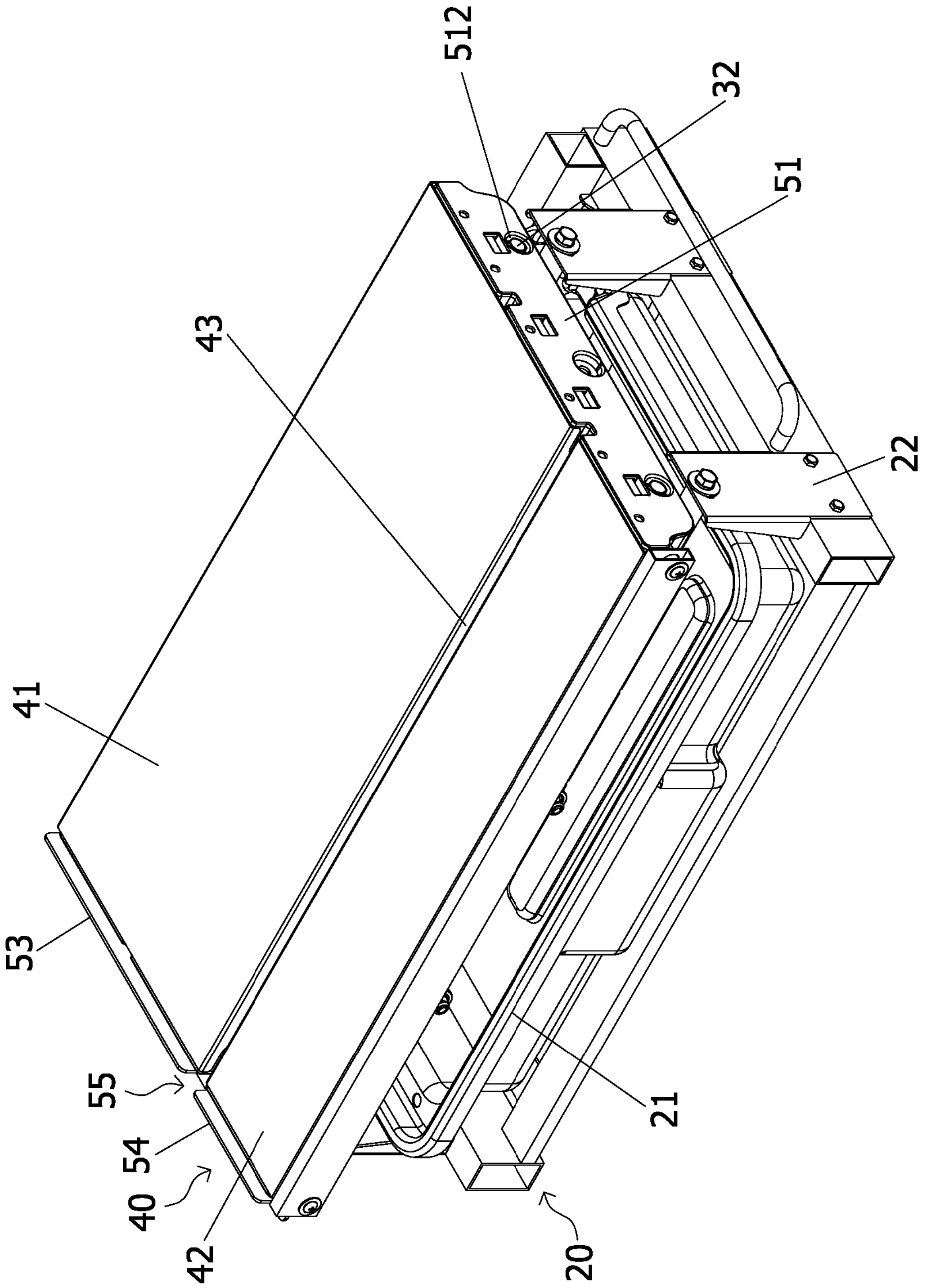
FIG. 3 is a stereoscopic assembled schematic view showing the present invention.
Figure 4:
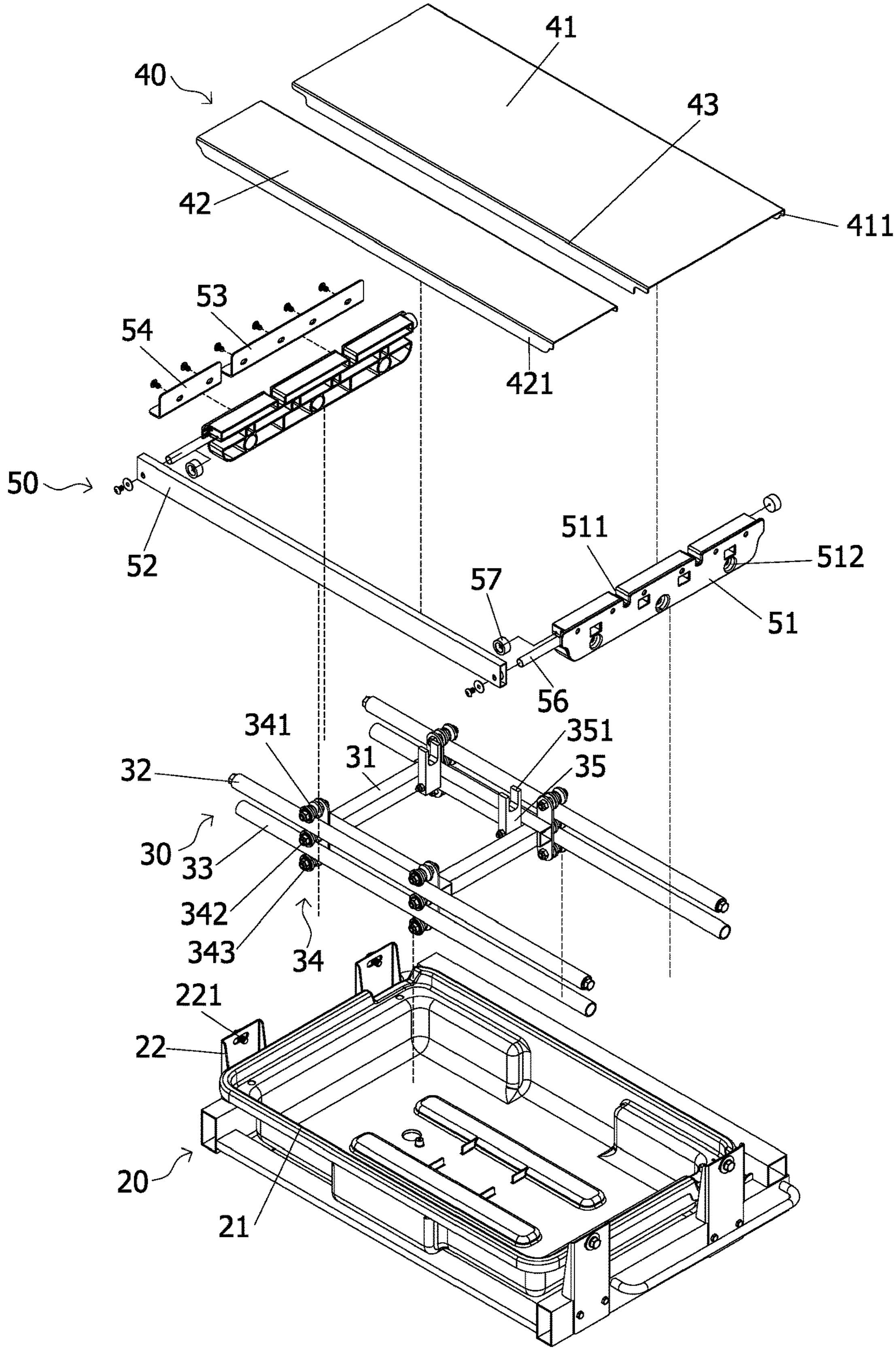
FIG. 4 is a stereoscopic disassembled schematic view showing the present invention.
Figure 5:
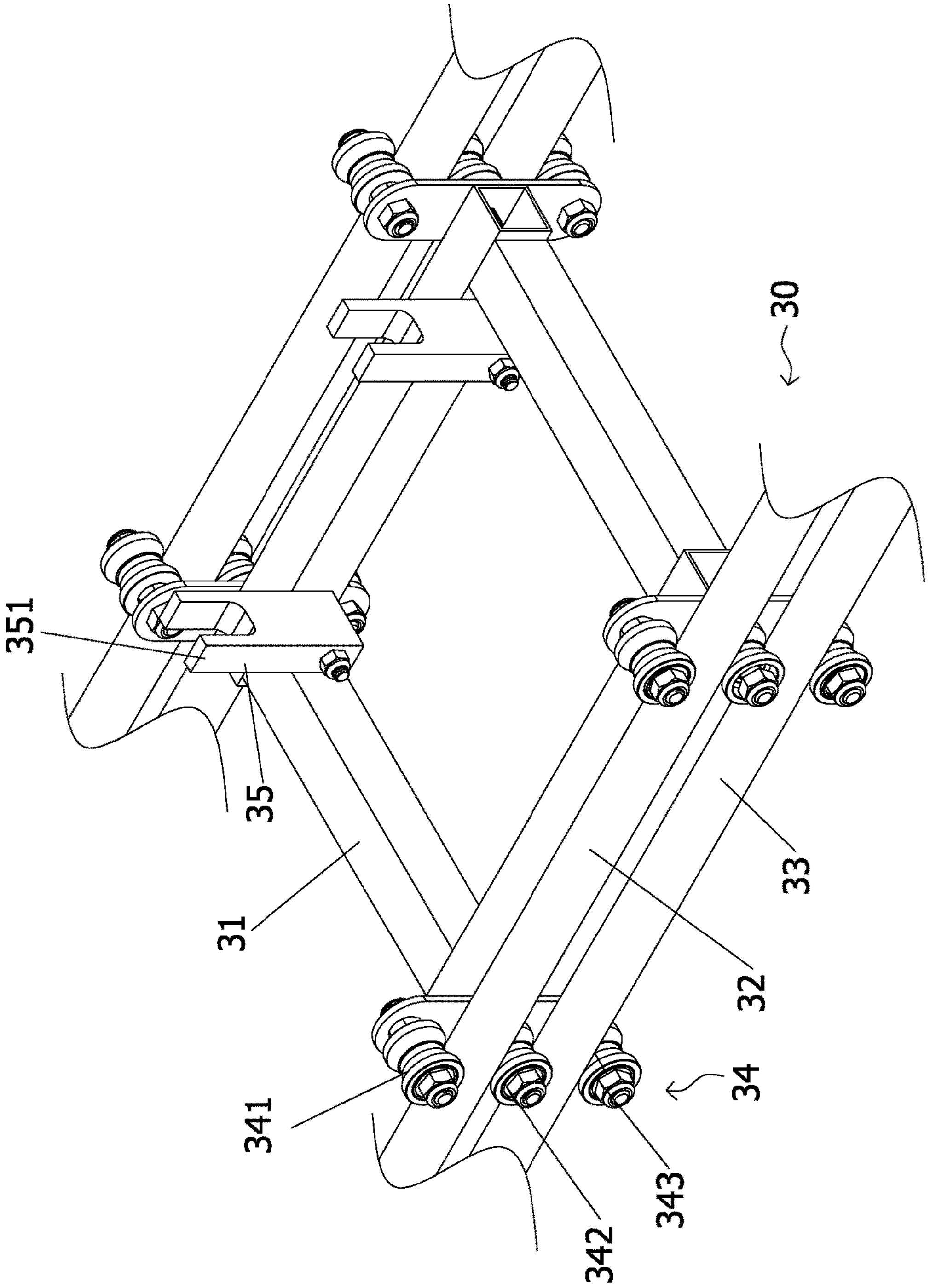
FIG. 5 is a zoomed-in stereoscopic schematic view showing a roller rack of the present invention.
Figure 8:
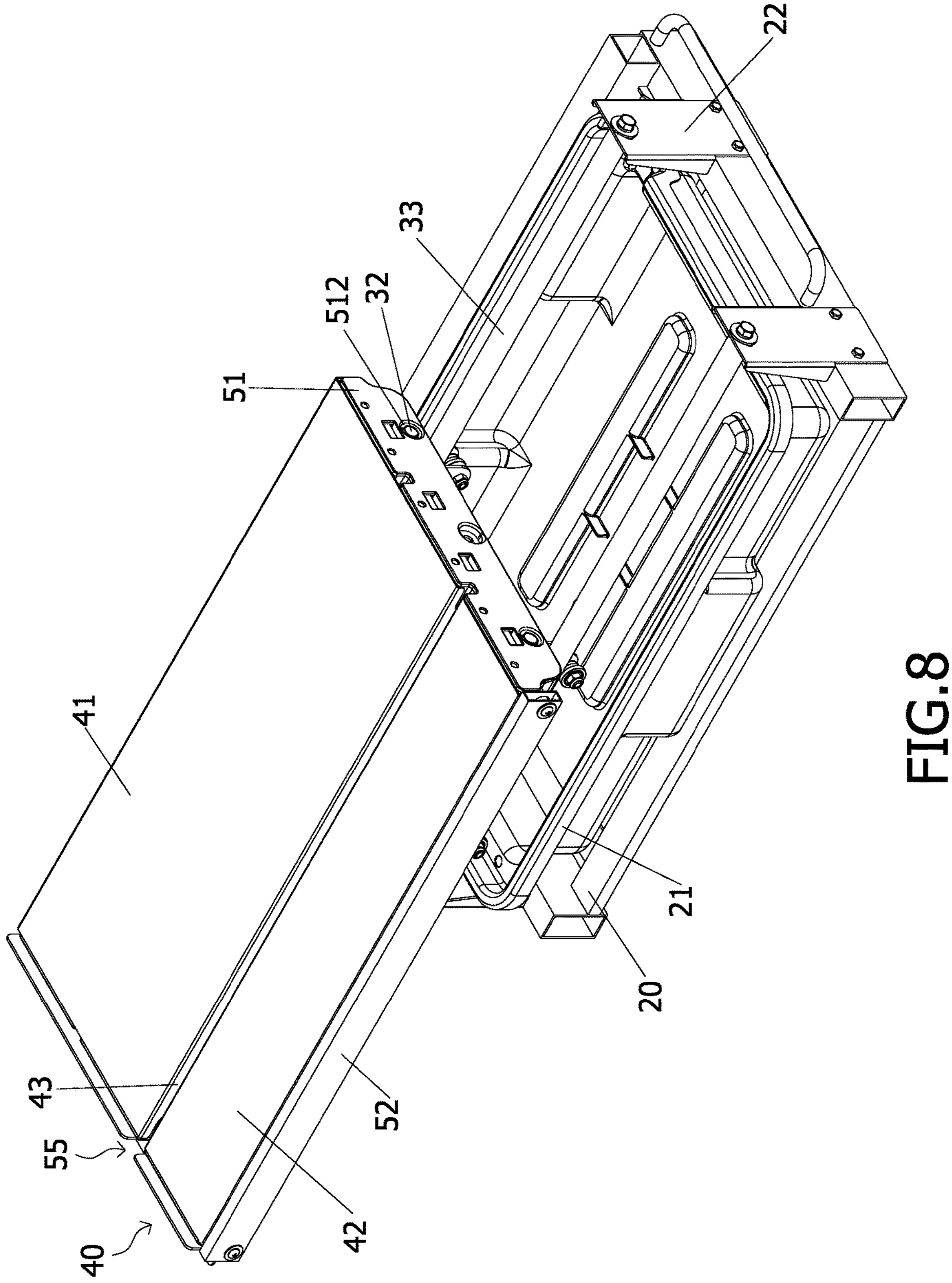
FIG. 8 is a stereoscopic schematic view showing a workbench extended to the maximum distance according to the present invention.
Figure 9:
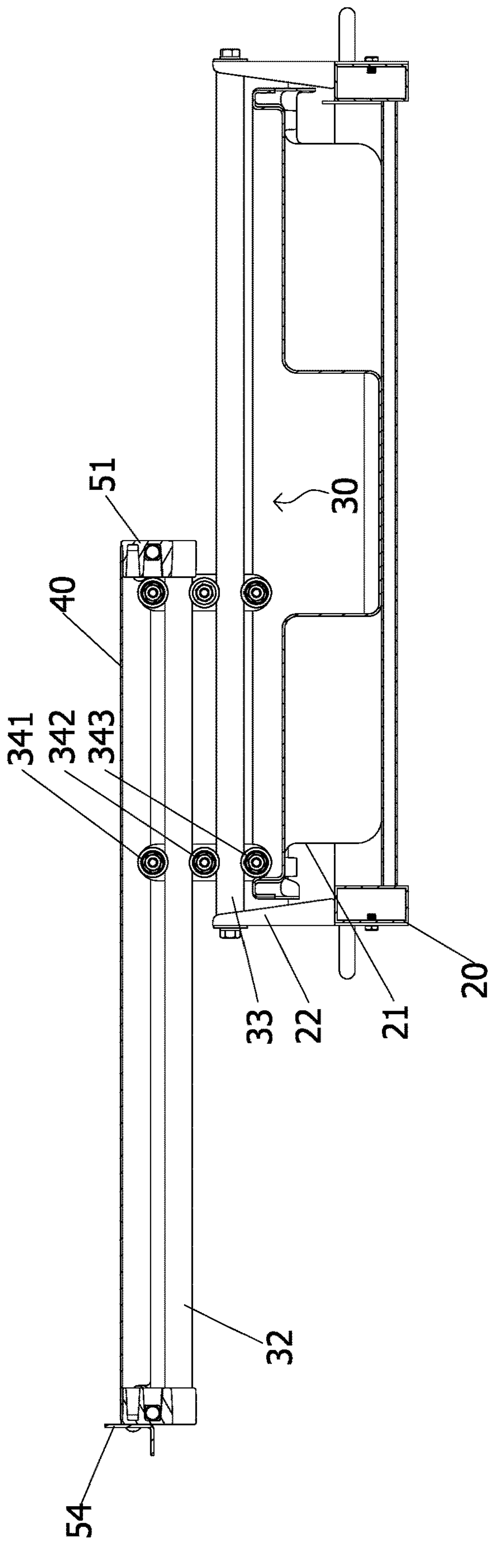
FIG. 9 is a plan schematic view showing a workbench extended to the maximum distance according to the present invention.

By means of said structural improvements, as shown in FIGS. 4, 8, 9, the present invention may be used to enable the workbench 40 to be pulled backwards during operation. When the workbench 40 is pulled manually, the workbench 40, the bench rack 50 and the upper sliders 32 are displaced synchronously in linkage. The roller rack 31 of the slider assembly 30 is lent on the lower sliders 33 on the base 20, while the lower sliders 33 are not moved. Since lengths of the upper sliders 32 and the lower sliders 33 are equivalent to a length of the base 20, the upper sliders 32 and the lower sliders 33 may be offset from top-to-bottom and move relatively in opposite directions. When the workbench 40 and the upper sliders 32 are displaced for a small distance, they may be further displaced backwards for another distance in linkage with the roller rack 31, and displacement of the workbench 40 is stopped when the lower rollers 343 at the back comes into contact with a rear wall of the water storage basin 21, thereby reaching a maximum limit of displacement. A plate is placed on the workbench 40, a position thereof is adjusted to a dimension required to be cut, and then the plate is pressed by hands, the workbench 40 is pushed back to enable the plate to be cut by the saw blade 61 of the cutter 60.

Figure 10:
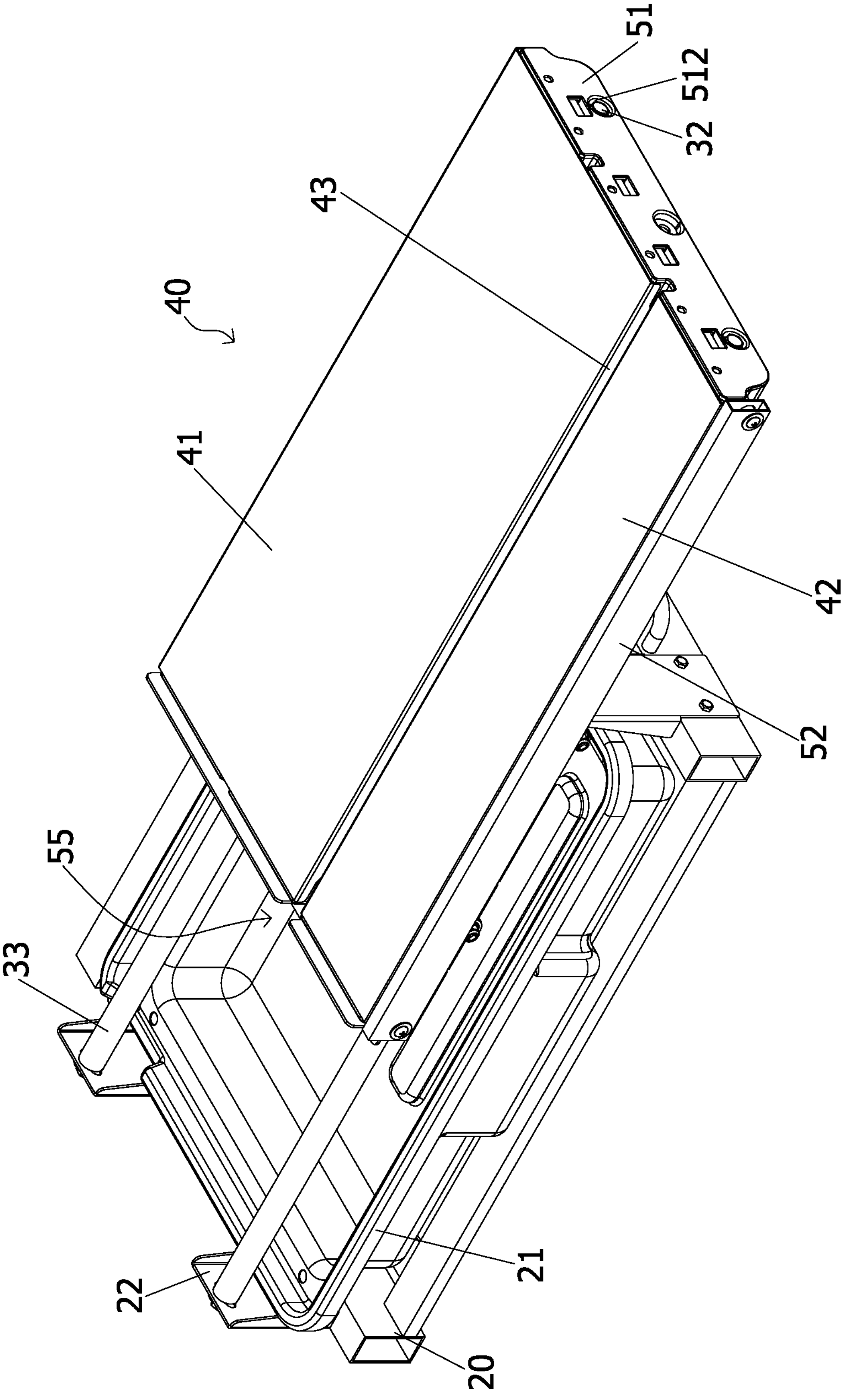
FIG. 10 is a stereoscopic schematic view showing a workbench pushed back to the maximum distance according to the present invention.
Figure 11:
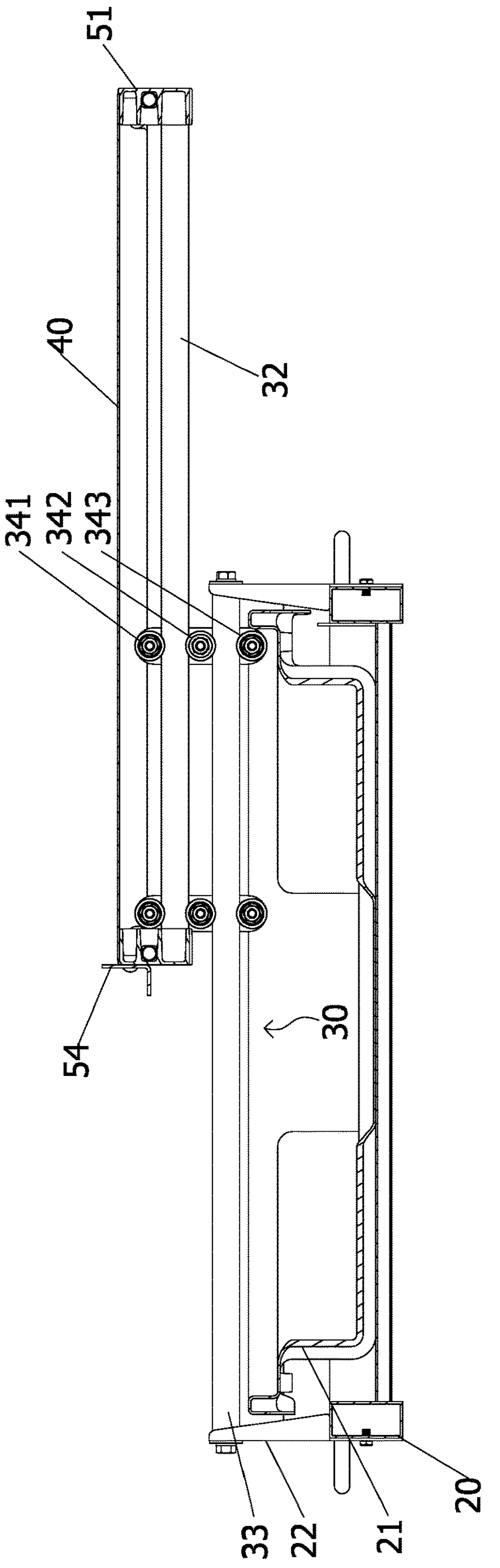
FIG. 11 is a plan schematic view showing a workbench pushed back to the maximum distance according to the present invention.

When the workbench 40 is pushed back, as shown in FIGS. 4, 10, 11, identically, the upper sliders 32 and the lower sliders 33 move relatively in a direction opposing to the direction previously. When the workbench 40 is pushed back and the upper sliders 32 are displaced for a small distance, the roller rack 31 is displaced forward in linkage for another distance, thereby enabling the plate to be completely cut by the saw blade 61 of the cutter 60, and displacement of the workbench 40 is stopped when the lower rollers 343 at the front comes into contact with a front wall of the water storage basin 21, thereby reaching a maximum limit of the returning displacement.

In the present invention, the main reason for the maximum limits of returning or extension in the displacement distance of the workbench 40 is due to the addition of a roller rack 31. The roller rack 31 may be moved in linkage, and therefore a linkage movement distance of the roller rack 31 is the added distance, which is longer than the displacement distance of a traditional workbench, and suitable for cutting a plate having a large surface area. Moreover, because the slider assembly 30 has the roller rack 31 which is a three-layer combination of the upper roller 341, the middle roller 342 and the lower roller 343, when the workbench 40 is pressed downwards by hands, the upper sliders 32 and the lower sliders 33 are kept parallel to each other all the time, an interval between the upper roller 341, the middle roller 342 and the lower roller 343 is kept unchanged stably. Therefore, even though the workbench 40 is pressed by hands in a certain position and a force from the hands is not evenly distributed, the workbench 40 is still capable of moving horizontally without tilting upwards slightly, which is an advantage of the present invention. In addition, the workbench 40 is straddled over the two straddle boards 51, and a support rack 35 is formed for supporting a bottom surface of the workbench 40, so as to enable the workbench 40 to be free from tilting even under a single point of pressure.

Figure 12:
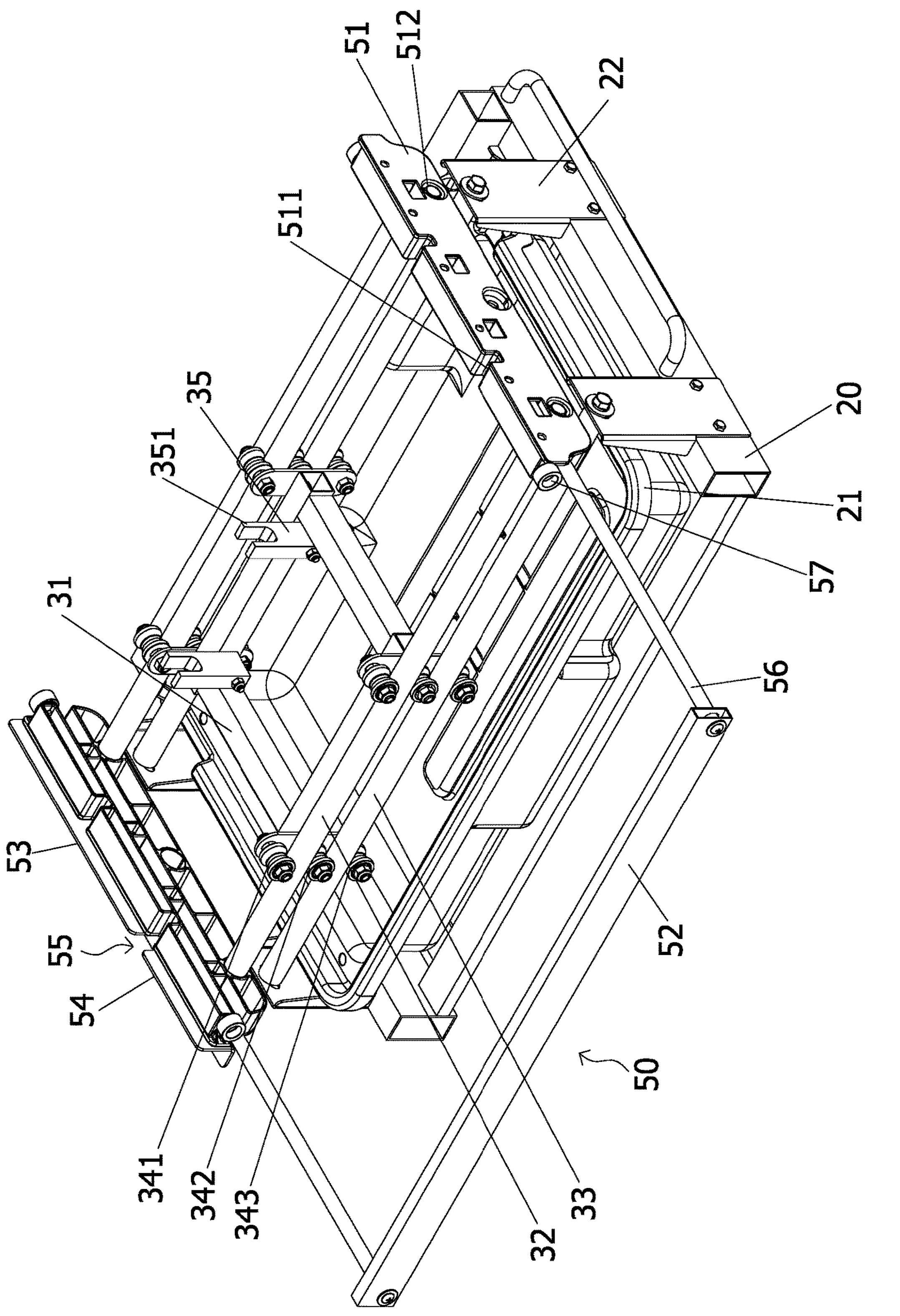
FIG. 12 is a stereoscopic schematic view showing the extended lateral extension platform and stretch rod according to the present invention.
Figure 13:
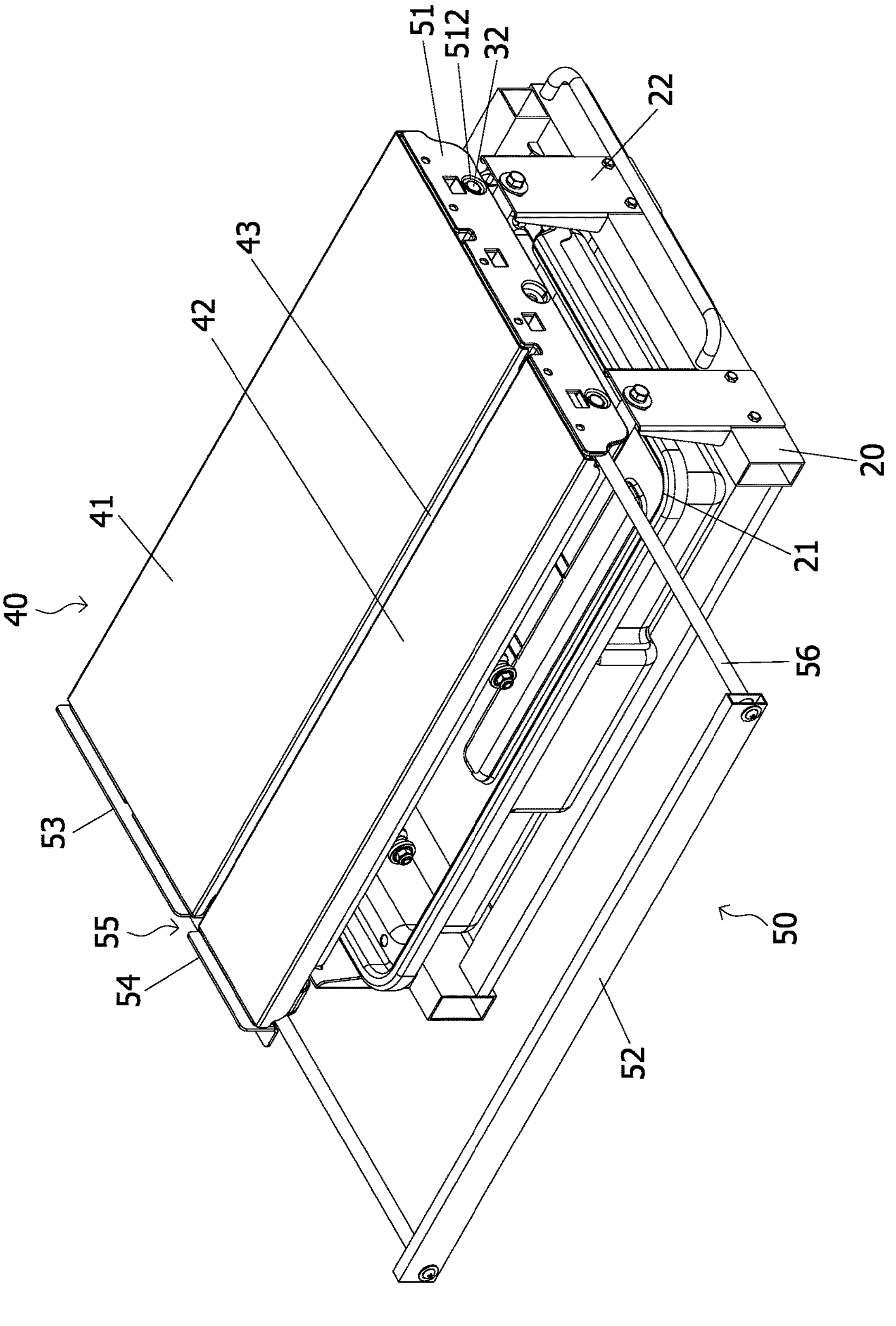
FIG. 13 is a stereoscopic schematic view showing the extended lateral extension platform, stretch rod and the assembled workbench according to the present invention.

As shown in FIGS. 12, 13, if a larger and wider plate is to be cut, simply pull out the lateral extension platform 52 on the side of the bench rack 50, and the stretch rod 56 may be synchronously pulled outwards by linkage with the lateral extension platform 52, so as to extend a placeable width of the workbench 40. The stretch rod 56, the lateral extension platform 52 and the workbench 40 may be used to provide for placement of wider plates which have larger surface areas. An anti-slip block 57 is respectively provided on two sides of the straddle boards 51, and the anti-slip blocks 57 may be used to provide the stretch rod 56 with a frictional force (the anti-slip blocks 57 are made of rubber). When the stretch rod 56 is pulled open, the stretch rod 56 is pressed by the anti-slip blocks 57 to generate a stabilizing anti-slippery force, and the stretch rod 56 is not shaken, displaced or detached along with vibrations of the cutter 60.

Further, the present invention provides a workbench 40 having a large bench surface 41 and a small bench surface 42, which may be disassembled and assembled on the straddle boards 51. The workbench 40 is non screw-fastening type for enabling fast assembly and disassembly, reducing a packing size and a transportation volume thereof, which facilitates convenient portability, cleaning and washing by an operator.

The present invention has the following advantages:

1. The length limitation of a cutting stroke imposed by machine in the traditional cutter is overcome, and a linkage double-rail slide workbench structure is developed. In addition to keeping an original cutting stroke of a small machine, a 1.6-fold cutting stroke is added by extension, thus making the small machine more convenient for transportation in a work environment.
2. The workbench 40 is linked in movement with the roller rack 31, so that a force application point of downward cutting by the saw blade 61 is linked to the roller rack 31 structure. During cutting movements, the roller set 34 and the support rack 35 for reinforcing the workbench 40 are present for support, so as to enable the workbench 40 to be kept under continuous stabilization, safety and precise cutting dimensions during operation.
3. The workbench 40 is designed to have a fast disassembly mode for facilitating convenient cleaning by the operator during use.
4. The lateral extension platform 52 has an enlarged cutting surface area for facilitating placement of larger plate dimensions.
5. The lateral extension platform 52 has the anti-slip block 57 added thereto by design, which may be used to achieve actions of immediate moving and immediate stopping without locking and fixing the lateral extension platform 52.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multi-layer roller stabilizing structure of a stone cutting machine, comprising: a base, a water storage basin, a slider assembly, a workbench and a bench rack, wherein the water storage basin is disposed on the base, and the base having a plurality of positioning boards disposed at the front and at the back thereof, one side of the base is provided to enable a cutter to be disposed thereon, and the cutter consists of a saw blade, the workbench is used for placement of stones, the workbench is supported by a bench rack, and the bench rack is disposed above the slider assembly, wherein the slider assembly is disposed on the base and the slider assembly includes a roller rack, a pair of upper sliders and a pair of lower sliders, wherein, the roller rack is a frame structure having two sides thereof provided with a plurality of roller sets respectively, each of the roller sets is a three-layer combination of an upper roller, a middle roller and a lower roller, wherein, the upper sliders are disposed above the lower sliders and mutually parallel to the lower sliders, the lower sliders are disposed between the middle roller and the lower roller, the upper sliders are disposed between the upper roller and the middle roller, the lower sliders having two ends thereof positioned on the positioning boards at the front and at the back of the base; the bench rack is constituted of two front-to-back symmetrical straddle boards and one lateral extension platform, the two symmetrical straddle boards are disposed in a front position and a rear position of the bench rack, and two ends of the upper sliders are positioned in the straddle boards at the front and at the back of the bench rack; accordingly, the workbench and the bench rack are moved synchronously in linkage with the upper sliders, the lower sliders are positioned on the base, the upper sliders and the lower sliders of the slider assembly are relatively displaced and offset from top-to-bottom, and the roller rack is actively displaced forwards and backwards, thereby stabilizing the workbench in front and rear displacements and extend a distance of front and rear displacements of the workbench.

2. The multi-layer roller stabilizing structure of a stone cutting machine of claim 1, wherein the workbench is a combination of two sheets including a large bench surface and a small bench surface, the large bench surface has a lateral sideboard disposed on two sides thereof, respectively, the small bench surface has a lateral sideboard disposed on two sides thereof, respectively, a cutting groove is formed between the large bench surface and the small bench surface, top surfaces of the straddle boards of the bench rack are provided with two positioning grooves and at least two upper slider assembly holes, in which one positioning groove is used to enable the lateral sideboard on an inner side of the large bench surface and the lateral sideboard on an inner side of the small bench surface to be embedded thereinto, and the upper slider assembly holes are used for fastening end portions of the upper sliders.

3. The multi-layer roller stabilizing structure of a stone cutting machine of claim 1, wherein an inner side of the roller rack of the slider assembly is fixed with a plurality of support racks, an U-shaped block is disposed above the support racks for contacting with a bottom surface of the workbench.

4. The multi-layer roller stabilizing structure of a stone cutting machine of claim 1, wherein the front-to-back symmetrical straddle boards of the bench rack having a stretch rod embedded thereinto respectively, the stretch rod and the straddle boards are parallelly provided, an end portion of the stretch rod is joined to the lateral extension platform, two sides of the straddle boards are respectively provided with an anti-slip block, and the anti-slip blocks are contacted with the stretch rod.

5. The multi-layer roller stabilizing structure of a stone cutting machine of claim 1, wherein a lower slider assembly hole is respectively provided above the positioning boards at the front and at the back of the base, and the lower slider assembly holes are used for fastening end portions of the lower sliders.

6. The multi-layer roller stabilizing structure of a stone cutting machine of claim 1, wherein a long guiding ruler and a short guiding ruler are fixed at the front of the straddle boards at the front of the bench rack, both the long guiding ruler and the short guiding ruler having L-shaped cross sections, and an interval is formed between the long guiding ruler and the short guiding ruler.

* * * * *